PROCESS FOR UPGRADING GELATIN VISCOSITIES

William O. Kenyon, Donald A. Smith, and Erle W. Taylor, Rochester, N.Y., assignors to Eastman Kodak Company, Rochester, N.Y., a corporation of New Jersey
No Drawing. Filed Aug. 27, 1962, Ser. No. 219,728
7 Claims. (Cl. 106—135)

This invention relates to a method for upgrading gelatin viscosities in alcohol containing solutions by the use of a dibisulfite of an alkylene or arylene diisocyanate.

It has been considered previously that gelatins of low viscosity are unsuitable for most gelatin coatings in photographic operations. It has been recognized that certain compounds such as alum or the like when added to aqueous solutions of gelatins increase the apparent viscosity and the average molecular weight of the gelatin. However, this phenomenon has not appeared to be useful because controlled increase in viscosity while maintaining homogeneity of the gelatin has not been feasible. In these instances, a tendency was noted towards the formation of centers or inhomogeneities in the solution in which centers the viscosity was much higher and actual gel formation occurred. Typical gelatin solutions whose viscosity has been increased appreciably by this treatment could not be filtered because of slugs or thickened portions which clog the pores of the filter. Some compounds having a viscosity-raising effect on gelatin produce an unstable gelatin complex which under conditions of use and storage is prone to decompose liberating either the compound itself or an undesired by-product.

One object of our invention is to provide a process for upgrading viscosities to selected values in which homogeneity is maintained. Another object of our invention is to provide a process for upgrading gelatin viscosities in which the gelatin solution obtained is filterable because of its substantial freedom from thickened portions. A further object of our invention is to upgrade gelatin viscosities in which the material obtained is stable under conditions of use and storage. Other objects of our invention will appear herein.

We have found that gelatin viscosities may be upgraded to a selected value by treating gelatin in dilute aqueous solution containing 10–25% by volume of alcohol of 2–4 carbon atoms with a dibisulfite addition product of an alkylene or arylene diisocyanate controlling the treatment to obtain a desired viscosity. We have found that by this treatment a gelatin derivative or complex is obtained in which 0.002–0.02 mole (in grams) of diisocyanate combines with 100 grams of gelatin. This material is obtained by treating gelatin in aqueous alcohol solution at an alkaline pH with an organic diisocyanate dibisulfite of the formula:

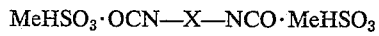

in which formula Me is an alkali metal and X is arylene or alkylene ($C_2$ to $C_{10}$) unsubstituted or substituted. If substituents are present they may be any one of lower alkyl or lower alkoxy of 1–4 carbon atoms, halogen or a 5 or 6 membered fused ring. The preferred compounds for use are those having the simple structures such as phenylene, tolylene, chlorophenylene or methoxyphenylene (in the case of the phenylenes). In its broadest aspects the invention includes a procedure involving treating gelatin with an organic diisocyanate dibisulfite of the above formula in which (1) 2–10% of the gelatin is dispersed in water containing 10–25% by volume of alcohol of 2–4 carbon atoms (2) 1–5% by weight (based on the gelatin) of the diisocyanate dibisulfite is used, and (3) the gelatin and isocyanate dibisulfite are reacted at a pH of 8–10 until the desired upgrading of viscosity of the gelatin is obtained.

There are two ways of operating such a procedure, the first of which involves the intermittent addition of diisocyanate dibisulfite as the reaction proceeds until the desired viscosity is reached or in the second of which the addition of the diisocyanate dibisulfite is made as one addition and when the desired viscosity is reached the action is terminated by reducing the pH below about 6. The first procedure is in general better adapted to the use of the phenylene diisocyanate dibisulfites are preferably used. Isopropyl and tertiary butyl alcohols are the preferred alcohols for use in the described procedure.

The upgrading of gelatin viscosity is useful for adapting gelatins having a low viscosity to photographic purposes. For instance, a gelatin which has a viscosity of 16–17 seconds at 5% concentration may be treated as described whereby the viscosity may be increased to 75±10 seconds, these viscosities being determined by a pipette viscosity determination. For instance, using a pipette in which water goes therethrough in 10 seconds if a gelatin solution of 2% goes through in 16–17 seconds that gelatin is regarded as having a viscosity of 16–17 seconds. The procedure described is also useful where diminished concentrations of gelatin are desirable in coating solutions without decrease in viscosity. For example, if a gelatin of good grade is used, a 10% solution thereof would give a solution of about 45 seconds viscosity. However if the gelatin were treated with diisocyanate to upgrade viscosity, a 5% solution of the gelatin might be used to obtain a 45 second viscosity solution which can be used in coating operation.

In upgrading gelatin viscosity using the phenylene compound, that material may be added at intervals to the gelatin solution, accompanied by determination of the viscosity before each addition, until the desired viscosity is reached. When the desired viscosity increase has been arrived at, the pH should be reduced to below 6 to stop the action, such as by the addition of acid. If the diisocyanate bisulfite is all added initially which is desirable in the use of the alkylene diisocyanates, the viscosity increase is observed and when the desired point is reached the pH is reduced below 6 to terminate the viscosity increasing action of the diisocyanate bisulfite. Coatings of the modified gelatin prepared as described are especially susceptible to quick setting by the method which involves incorporating formaldehyde in the gelatin solution and fuming of the coatings thereof with ammonia vapor (see U.S. Patent No. 2,652,345). It was noted that coatings of modified gelatins set in this fashion show no evidence of remelting. These modified gelatins are useful as vehicles or carrying agents for various types of dispersed particles such as silver halide, dyes, oil in water dispersions and the like.

The process of this invention is useful for application to any of the various types of gelatin regardless of whether they were derived from bone, pigskin, hide or other sources of gelatin. The treatment of the gelatin is terminated while the solution is readily flowable as distinguished from treatments in which gumming, slug formation, gelling or the like would occur. Some diisocyanate bisulfites which are useful are hexamethylene diisocyanate bisulfite adduct, tolylene diisocyanate bisulfite adduct, decamethylene diisocyanate bisulfite adduct or in fact any of the compounds in accordance with the formula given for the compounds of that type.

The following examples illustrate our invention:

Example 1

A solution was prepared at 40° F. of 250 grams of bone gelatin in 4000 ml. of water and 750 ml. of t-butyl alcohol. This solution had a pH of 5.7 and a viscosity of 24.5 seconds. 25 ml. of a 10% aqueous solution of 2,4-tolylenediisocyanate bisulfite was added thereto followed by the addition of 50 ml. of 5% aqueous sodium hydroxide which brought the pH to 9.3. The viscosity quickly rose to 31.3 seconds. After 4 minutes, 25 ml. of the isocyanate solution was added producing a viscosity of 39.1 seconds. A total of 80 ml. of isocyanate solution was added in 20 ml. increments at intervals of a few minutes producing a final viscosity of 62.2 seconds. 10% sulfuric acid was then added to reduce the pH to 5.7 and the solution was brought to its original weight with distilled water. The viscosity after this dilution was 46.7 seconds. A sample of this product when adjusted to 2% concentration had a viscosity of 16.6 seconds and a setting time of 11 seconds. It was easily filterable under mild suction. The bulk material was chilled, noodled, washed and dried in the usual manner. A 2% solution in water was made from the dried sample which solution had a viscosity of 15.9 seconds and a setting time of 12 seconds which solution was easily filterable.

*Example 2*

A solution was prepared at 40° F. of 25 grams of bone gelatin in a mixture of 400 ml. of water and 74 ml. of t-butyl alcohol. 10 ml. of 5% aqueous 1,10-decamethylenediisocyanate dibisulfite was added over a period of 1½ hours together with 10 ml. of 5% NaOH whereby a viscosity of 50.2 seconds was attained. 10% sulfuric acid was added to drop the pH to 5.5 and the product was worked up in the usual manner. The 2% solution thereof was readily filterable.

*Example 3*

A solution was prepared at 40° F. of 50 grams of bone gelatin in 500 ml. of water. A mixture of 150 ml. of isopropyl alcohol and 300 ml. of water was added. The temperature was brought back to 40° F. whereupon 18 ml. of a 5% aqueous solution of hexamethylene diisocyanate dibisulfite was added followed by sufficient aqueous NaOH to bring the pH to 9.55. The pH was kept at approximately this value by the constant addition of 5% NaOH wherein after one minute the viscosity was 23.3 seconds and the viscosity had gone up to 63.7 seconds at the end of 26 minutes. The reaction was stopped by adding 10% sulfuric acid to reduce the pH to 5.8. This gave a viscosity of 51 seconds. A sample of the material was diluted to 2% concentration and was found to be readily filterable. This solution of 2% concentration had a viscosity of 16.3 seconds and a setting time of 12 seconds. The gelatin without this treatment required 23 seconds for setting under the same conditions.

The bulk of the reaction mixture was chilled, noodled, washed six hours with cold, distilled water and dried. A sample of the dried material was made up to 2% concentration in water at 40° F. and then heated 20 minutes at 60° F. It was easily filterable through a paper and had a viscosity of 15.1 seconds and a setting time of 18 seconds.

We claim:

1. A method of upgrading the viscosity of gelatin which comprises adding to an aqueous solution of gelatin containing 10–25% by volume of an alcohol of 1 to 4 carbon atoms, 1–5%, based on the weight of the gelation, of an organic diisocyanate dibisulfite of the formula:

$$MeHSO_3 \cdot OCN-X-NCO \cdot MeHSO_3$$

in which formula Me is an alkali metal and X is selected from the group consisting of the alkylene groups of 2–10 carbon atoms and arylene groups, substituted and unsubstituted, when substituents are present being selected from the group consisting of alkyl of 1–4 carbon atoms, alkoxy of 1–4 carbon atoms, and halogen, which mixture is allowed to stand at a pH of 8–10.

2. A method of upgrading the viscosity of gelatin in solution in dilute aqueous solution containing 10–25% by volume of alcohol of 1–4 carbon atoms, which comprises mixing therein 1–5%, based on the weight of the gelatin, of an arylene diisocyanate dibisulfite and maintaining the solution at a pH of 8–10.

3. A method of upgrading the viscosity of gelatin in dilute aqueous solution containing 10–25% by volume of an alcohol of 1–4 carbon atoms, which comprises adding thereto 1–5%, based on the weight of the gelatin, of an alkylene diisocyanate dibisulfite and maintaining the solution at a pH of 8–10.

4. A method of upgrading the viscosity of gelatin in dilute aqueous solution containing 10–25% of tert. butyl alcohol, which comprises adding to the solution 1–5%, based on the weight of the gelatin, of the dibisulfite addition product of tolylene diisocyanate and maintaining the solution at a pH of 8–10.

5. A method of upgrading the viscosity of gelatin in dilute aqueous solution containing 10–25% by weight of isopropyl alcohol, which comprises adding thereto 1–5%, based on the weight of the gelatin, of the dibisulfite addition product of hexamethylene diisocyanate and maintaining the solution at a pH of 8–10.

6. A method of upgrading the viscosity of gelatin in dilute aqueous solution containing 10–25% by volume of an alcohol of 1–4 carbon atoms, which comprises adding thereto 1–5%, based on the weight of the gelatin, of an arylene diisocyanate dibisulfite at intervals while maintaining the solution pH at 8-10.

7. A process for upgrading the viscosity of gelatin which comprises dissolving gelatin, having a viscosity of 16–17 seconds at 2% concentration, in water containing 10–25% of tertiary butyl alcohol, adding thereto 1–5%, based on the weight of the gelatin, of a dibisulfite addition product of an organic diisocyanate having the formula:

$$MeHSO_3 \cdot OCN-X-NCO \cdot MeHSO_3$$

in which formula Me is an alkali metal and X is selected from the group consisting of the alkylene groups at 2–10 carbon atoms and arylene groups, substituted and unsubstituted, when substituents are present being selected from the group consisting of alkyl of 1–4 carbon atoms, alkoxy of 1–4 carbon atoms and hydrogen, and maintaining the solution at a pH within the range of 8–10 until the gelatin has increased in viscosity to 75±10 seconds.

References Cited by the Examiner

UNITED STATES PATENTS 3,103,437   9/1963   Henn et al. _____ 106—125

ALEXANDER H. BRODMERKEL, *Primary Examiner.*

MORRIS LIEBMAN, *Examiner.*